United States Patent [19]
Hadar

[11] Patent Number: 6,012,650
[45] Date of Patent: Jan. 11, 2000

[54] DISPENSER PARTICULARLY USEFUL FOR AMATEUR GARDENERS

[75] Inventor: Yoram Hadar, Natania, Israel

[73] Assignee: Lego Irrigation Ltd., Natania, Israel

[21] Appl. No.: 09/019,421

[22] Filed: Feb. 5, 1998

[30] Foreign Application Priority Data

Aug. 8, 1995 [IL] Israel .......................................... 114873

[51] Int. Cl.[7] ................................................... B05B 7/26
[52] U.S. Cl. ...................... 239/317; 239/318; 239/581.1; 222/630; 137/268; 137/625.31
[58] Field of Search ..................... 239/310, 316, 239/317, 318, 407, 433, 581.1; 137/218, 268, 625.29, 625.31, 891, 893, 894; 222/630

[56] References Cited

U.S. PATENT DOCUMENTS

| | | | |
|---|---|---|---|
| 1,458,975 | 6/1923 | Clauson | 239/317 |
| 2,235,278 | 3/1941 | Brunner | 239/318 X |
| 2,246,211 | 6/1941 | Kilich | 239/318 X |
| 3,770,205 | 11/1973 | Proctor et al. | 239/317 |
| 4,281,796 | 8/1981 | Fugent et al. | 239/581.1 X |
| 4,785,850 | 11/1988 | Sanchez | 239/317 X |
| 5,183,206 | 2/1993 | Gavin | 239/317 |

*Primary Examiner*—Andres Kashnikow
*Assistant Examiner*—Steven J. Ganey
*Attorney, Agent, or Firm*—Benjamin J. Barish

[57] ABSTRACT

A dispenser for dispensing a mixture of a substance diluted with a liquid, includes a housing having an attaching section for attaching the housing to a container for the substance, a dispenser inlet for connection to a pipe supplying the liquid, a dispenser outlet for connection to a pipe to deliver the mixture, a chamber communicating with the dispenser inlet and outlet and including a chamber bottom wall formed with a container inlet port and with a container outlet port such that, when a container is attached to the housing, the container inlet port leads from the chamber to the container, and the container outlet port leads from the container via the chamber to the dispenser outlet, and a control valve in the chamber for controlling the flow of the liquid therethrough to the container inlet port.

18 Claims, 5 Drawing Sheets

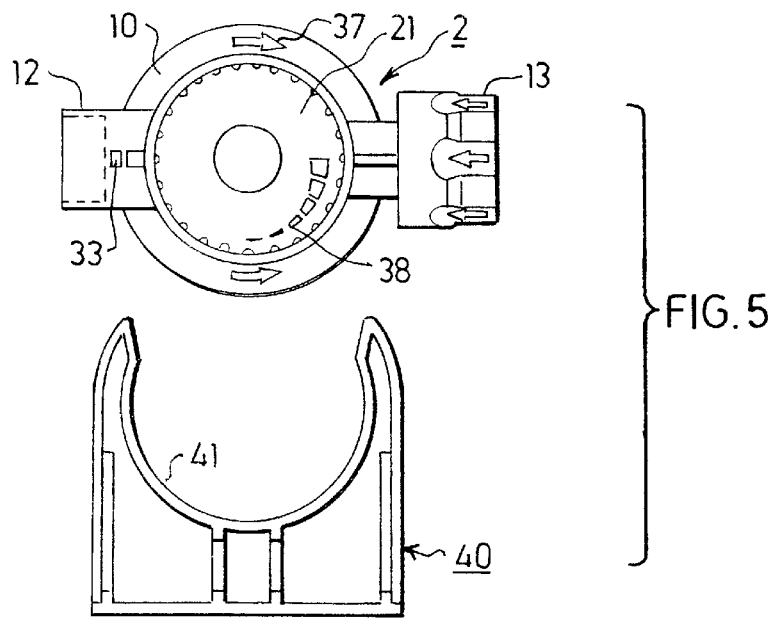
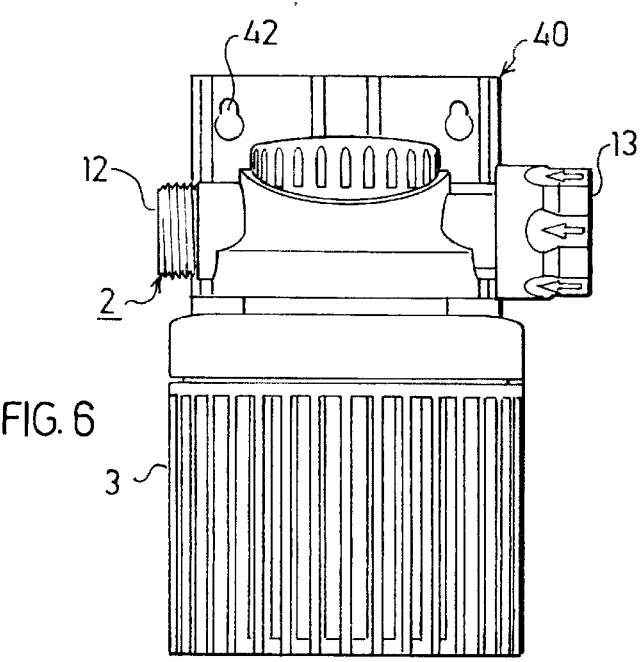
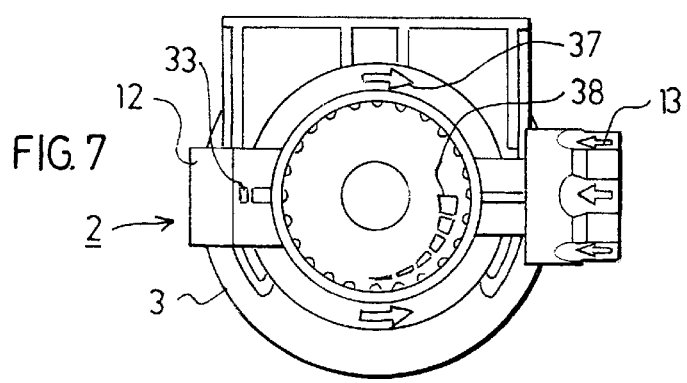

DISPENSER PARTICULARLY USEFUL FOR AMATEUR GARDENERS

FIELD AND BACKGROUND OF THE INVENTION

The present invention relates to dispensers for dispensing mixtures of substances diluted with a liquid. The invention is particularly useful for dispensing fertilizers, herbicides, or other substances by unskilled or amateur gardeners, and is therefore described below with respect to such an application.

Fertilizers, herbicides, and other substances are generally added to water when applied to plants. One common type of dispenser for doing this includes a venturi pump which utilizes the water flow to draw the additive into the water as the water is being dispensed. However, such dispensers generally require that the additive be in liquid form in order to enable them to be drawn into the water, and therefore cannot be efficiently used where the additive is supplied in the form of a solid, powder, or viscous liquid.

OBJECTS AND SUMMARY OF THE INVENTION

An object of the present invention is to provide a dispenser that can also be used for dispensing substances supplied in the form of a solid, powder, or viscous liquid. Another object of the invention is to provide a dispenser of a simple, compact construction, which can be produced in volume at relatively low cost, and which can be conveniently used by amateur gardeners.

According to the present invention there is provided a dispenser for dispensing a mixture of a substance diluted with a liquid, the dispenser including a housing comprising: an attaching section for attaching the housing to a container for the substance; a dispenser inlet for connection to a pipe supplying the liquid; a dispenser outlet for connection to a pipe to deliver the mixture; a chamber communicating with the dispenser inlet and outlet and including a chamber bottom wall formed with a container inlet port and with a container outlet port such that, when a container is attached to the housing, the container inlet port leads from the chamber to the container, and the container outlet port leads from the container via the chamber to the dispenser outlet; and a control valve in the chamber for controlling the flow of the liquid therethrough to the container inlet port.

According to further features in the described preferred embodiment, the container inlet port is eccentric with respect to, and extends obliquely through, the chamber bottom wall so as to be slanted in the tangential direction of the container such that when the container is attached to the housing, the container inlet port produces a swirl in the liquid inputted therethrough into the container to enhance the mixing thereof with the substance in the container. In addition, the container outlet port is also eccentric with respect to the chamber bottom wall, but at the opposite side from the inlet port, and also extends obliquely through the bottom wall so as to be slanted in the tangential direction of the container to enhance the swirl and the mixing of the liquid with the substance in the container.

According to further features in the described preferred embodiment, the control valve further includes a flow divider for dividing the flow of the liquid in the chamber from the dispenser inlet into a first stream directed through a first path from the dispenser inlet to the container inlet port when the container is attached to the housing, and a second stream directed through a second path from the dispenser inlet directly to the dispenser outlet. In the described preferred embodiment, the chamber is of cylindrical configuration, and the control valve is manually rotatable therein to adjust the relative proportions of liquid in the first and second streams.

As will be described more particularly below, a dispenser constructed in accordance with the foregoing features is capable of dispensing substances supplied in the form of solids, powders, and viscous or non-viscous liquids. The dispenser may also be manually adjusted in a convenient manner for controlling the concentration of the substance in the dispensed mixture. In addition, such a dispenser can be constructed of a relatively few simple parts which may be produced in volume and at low cost, can be used in a convenient manner by amateur gardeners, and can be applied to a wide variety of gardening equipment.

Further features and advantages of the invention will be apparent from the description below.

BRIEF DESCRIPTION OF THE DRAWINGS

The invention is herein described, by way of example only, with reference to the accompanying drawings, wherein:

FIG. 5 is an exploded view illustrating a mounting member and a dispenser to be mounted thereby;

FIG. 6 is a side elevational view illustrating the dispenser attached to the mounting member of FIG. 5;

FIG. 7 is a top plan view of the dispenser and mounting member of FIG. 6;

DESCRIPTION OF A PREFERRED EMBODIMENT

Figure 1:
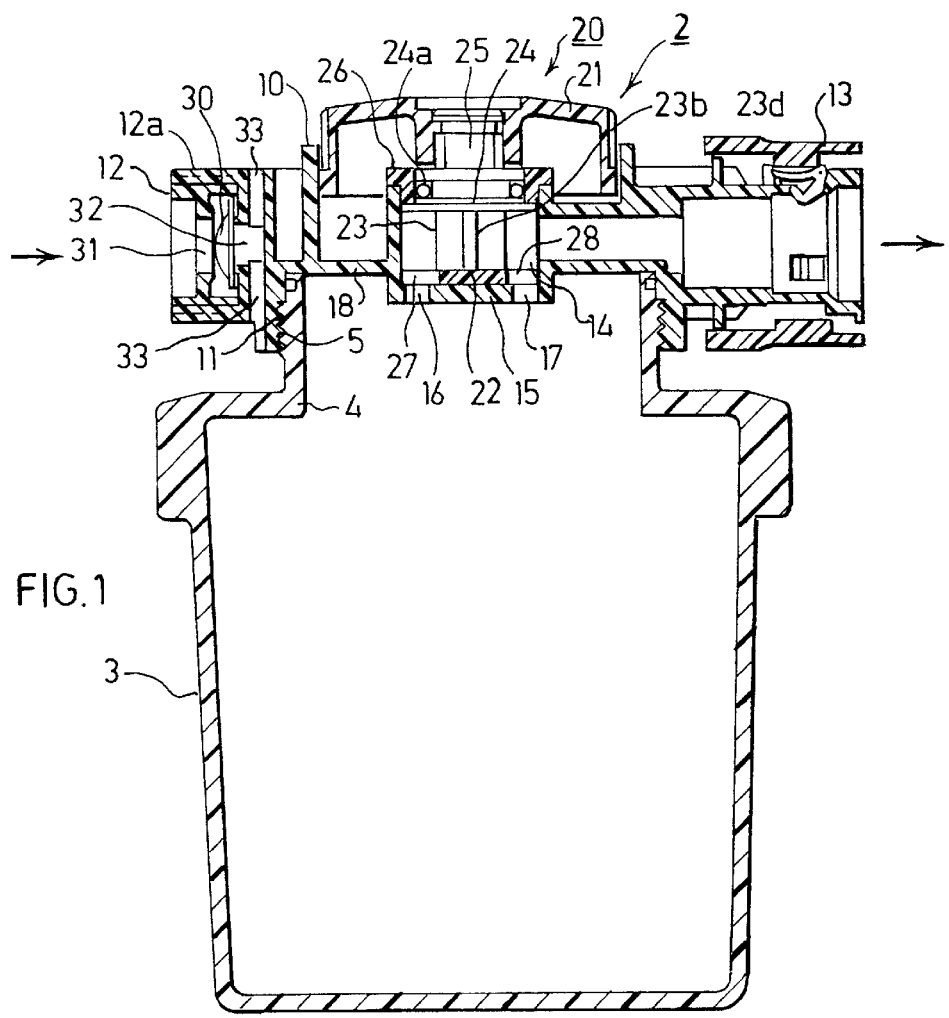
FIG. 1 is a longitudinal sectional view, illustrating one form of dispenser constructed in accordance with the present invention as attached to a container for a substance to be dispensed.

The dispenser illustrated in FIG. 1 is generally designated 2, and is shown as attached to a container 3 for the substance to be dispensed. As indicated earlier, the substance in container 3 may be in any form, such as a solid, powder, or liquid. Container 3 includes a neck 4 formed with external threads 5 for permitting convenient attachment and detachment of the dispenser 2.

Dispenser 2 includes a housing, generally designated 10, formed with internal threads 11 for attachment to container 3 via threads 5 of the container. Housing 10 further includes a dispenser inlet fitting 12 at one end for connection to a pipe supplying the liquid, e.g., water, to be used in dispensing the substance within the container, and a dispenser outlet fitting 13 at the opposite end for connection to a pipe to deliver the mixture of the water and the substance. For example, for agricultural purposes, the substance within container 3 may be a herbicide, fertilizer, or other additive to water applied to crops or plants.

Inlet fitting 12 is formed with external threads 12a for connection to the water supply pipe (not shown). Outlet fitting 13, however, is preferably of the well known quickly-attachable pull-type, which permits convenient attachment and detachment of the pipe delivering the mixture to the crops.

Dispenser housing 10 is formed with a central cylindrical chamber 14 communicating with the inlet fitting 12 on one side, and with outlet fitting 13 on the opposite side. The bottom of chamber 14 is closed by a bottom wall 15 formed with a container inlet port 16 leading from chamber 14 into container 3 when the container is attached to housing 10, and a container outlet port 17 leading from the container via chamber 14 to the outlet fitting 13. Bottom wall 15 of chamber wall 14 is circumscribed by bottom wall 18 of the housing 10. Walls 15 and 18 together serve as a common top wall for container 3 when the container is attached to the housing by threads 5 and 11, such that the only communication with the container is via the container inlet port 16 and the container outlet port 17.

The container inlet port 16 is eccentric with respect to wall 15 (FIG. 2), and extends obliquely through the wall (FIG. 2b) so as to be slanted in the tangential direction of the container. Thus, when container 3 is attached to the dispenser 2, a swirl is produced in the water inputted via port 16 into the container, thereby enhancing the mixing of the water with the substance in the container. Outlet port 17 is similarly formed eccentrically of and obliquely through wall 15 of the container so as to be slanted in the tangential direction of the container, but at the opposite side from the inlet port 16, thereby enhancing the swirl produced in the water and the mixing of the water with the substances in the container.

Dispenser 2 further includes a manually-rotatable control valve, generally designated 20, disposed within chamber 14 for controlling the flow of the liquid therethrough to the container inlet port 16, as well as to the outlet fitting 13. Control valve 20 includes a knob 21 located externally of chamber 14, and a valve assembly including a lower disc 22, an upper disc 24, and a plurality of ribs 23, secured between the two discs, rotatable within chamber 14. Control valve 20 further includes a sealing ring 24a, a non-circular stem 25 received within a complementary socket within knob 21, and a collar 26 closing the outer end of chamber 14 but permitting the control valve to be manually rotated within that chamber by rotating knob 21.

Figure 4:
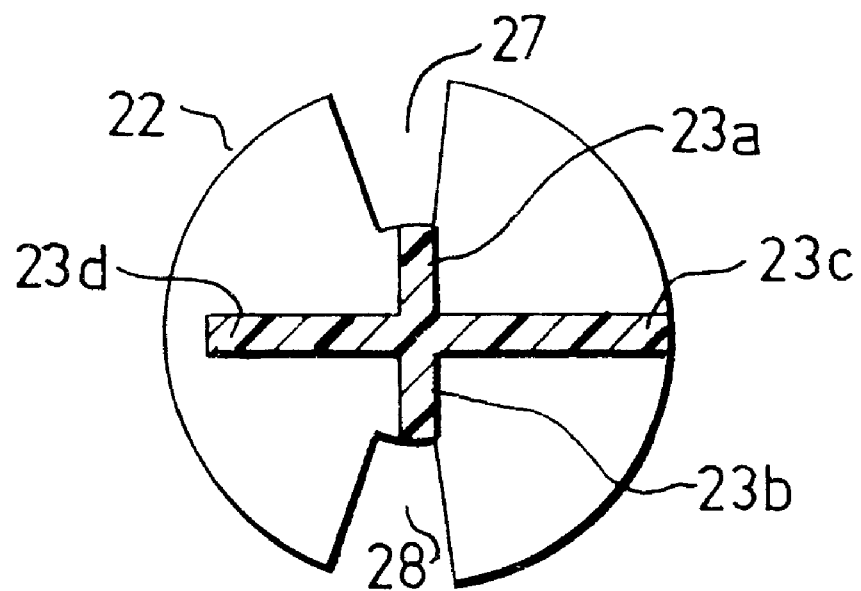
FIG. 4 is a sectional view along line 4—4 of FIG. 3.

As shown particularly in FIG. 4, the lower disc 22 is formed with two openings 27, 28 at diametrically opposite sides. Both openings 27, 28 are of enlarged area and of somewhat trapezoidal configuration, tapering inwardly towards the center of chamber 14. Opening 27 normally overlies the container inlet opening 16 formed in wall 15 of chamber 14, and opening 28 normally overlies the container outlet opening 17 formed in the chamber wall 15.

Figures 2, 2A, 2B:
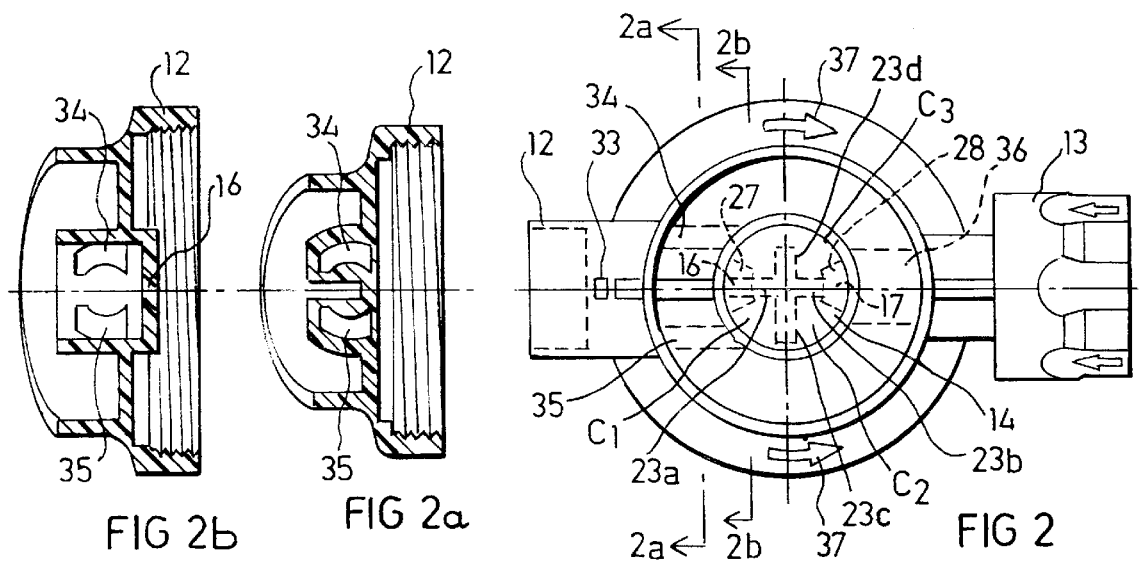
FIG. 2 is a top plan view of the dispenser of FIG. 1.
FIGS. 2a and 2b are sectional views along lines 2a—2a and 2b—2b of FIG. 2.
Figure 3:
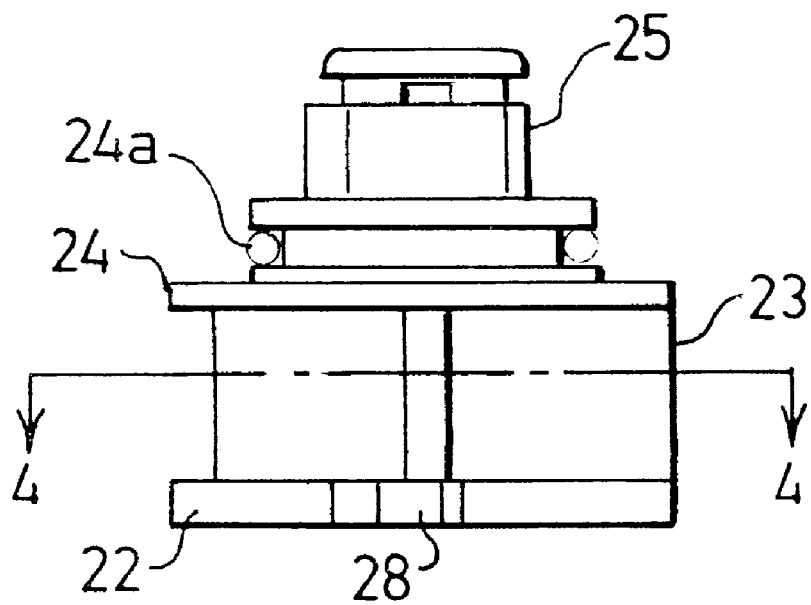
FIG. 3 is a side elevational view of the valve member in the dispenser of FIGS. 1 and 2.

As shown in FIGS. 2–4, there are four ribs 23a–23d, all radiating from the center of the chamber outwardly towards the inner surface of the chamber wall. Two ribs 23a, 23b are short ribs and are aligned with the openings 27, 28 in the lower disc 22. The third rib 23c extends to and engages the inner surface of chamber wall 14, and thereby define two compartments $C_1$, $C_2$. The fourth rib 23d, however, terminates short of the inner surface of the chamber wall, and therefore defines a larger third compartment $C_3$. The ribs 23a–23d are spaced equally around the center of the chamber, such that each compartment $C_1$ and $C_2$ occupies a sector of 90°, whereas compartment $C_3$, because of the shortness of rib 23d, occupies a sector of 180°.

The dispenser inlet fitting 12 further includes a check valve 30 in the form of a flexible diaphragm mounted between two openings 31, 32 in the inlet fitting 12, leading to chamber 14. Opening 32 communicates with a vent 33, and is straddled on its opposite sides by a pair of passageways 34, 35 for directing the liquid (water) introduced via inlet fitting 12 into chamber 14. As shown particularly in FIG. 2, passageways 34 and 35 lead into compartment $C_3$ and $C_1$, respectively of chamber 14 on opposite sides of the container inlet opening 16. The outlet from chamber 14 to the outlet fitting 13 is a large passageway, shown by broken lines 36 in FIG. 2, diametrically opposite to the two inlet passageways 34, 35.

Vent 33 is normally closed by check valve 30, but is opened by the check valve when there is a backflow, i.e., from chamber 14 towards the inlet fitting 12. As shown in FIG. 1, vent 33 includes extensions on opposite sides of opening 32 leading to the atmosphere so that if a backflow occurs, it will be vented to the atmosphere via these extensions.

The outer face of housing 10 may be formed with indicia, as shown at 37, to indicate the direction of water flow from the inlet fitting 12 to the outlet fitting 13. The outer face of knob 21 of control valve 20 may be provided with indicia, as shown at 38 in FIGS. 5, 7 and 8, to indicate the direction of rotation of the knob in order to increase or decrease the concentration of the ;substance in container 3 in the liquid mixture exiting from the outlet fitting 13.

The illustrated dispenser may be used as follows:

The substance to be mixed with the water is contained within container 3 which is attached, by threads 5 and 11, to the dispenser 2. Inlet fitting 12 is connected to the water supply pipe, and outlet fitting 13 is connected to the pipe to deliver the mixture, e.g., a hand sprayer (FIG. 8) or a water sprinkler (FIG. 9). Before the water supply is turned on, knob 21 of control valve 20 is rotated to select the desired concentration of the substance in the outletted mixture.

The amount of water diverted to the container 3, as compared to the amount fed directly via chamber $C_3$ to the outlet fitting 13 via passageway 36, depends on the positions of openings 27, 28 in disc 22 of the control valve 2, with respect to the container inlet and outlet ports 16, 17. FIG. 2 illustrates the condition wherein openings 27 and 28 are fully aligned with the container inlet and outlet ports 16, 17, respectively, which will thereby produce the highest concentration of the container substance in the dispensed mixture. To decrease this concentration, knob 21 would be rotated counter-clockwise.

The water supply pipe may then be turned on. Water from the supply passes via opening 31 (opened by check valve 30) opening 32, and passageways 34 and 35, into the cylindrical chamber 14. The ribs 23a–23d of control valve 20 within chamber 14 divide the inletted water into two streams: A first stream is directed by ribs 23a, 23c to flow through a first path which includes compartment $C_1$, opening 27 in valve disc 22, container inlet opening 16 in end wall 15 of chamber 14 (wherein it mixes with the substance within that container), container outlet opening 17, opening 28 in valve disc 22, compartment $C_2$ of chamber 14, and passageway 36 to the outlet fitting 13. A second stream of the inletted water is directed into compartment $C_3$, and because rib 23d does not extend to the inner surface of the wall of that compartment, this stream flows directly to the outlet passageway 36 from chamber 14 to the outlet fitting 13.

The flow of the water through the first path picks up a quantity of the substance within container 3 and mixes it in the outlet passageway 36, with the flow of the water through the second path which bypasses container 3 and leads directly to the outlet passageway 36. The relative proportions of the water flowing through the above two paths depend on the position of knob 21 of control valve 20, as described above.

It will also be seen that since the container inlet port 16 and outlet port 17 both extend obliquely through the top wall of the container 3 on opposite sides of its central axis, a swirl is produced in the water diverted into container 3, which thereby enhances the mixing of the water with the substance 3 in the container before the mixture is outletted via the container outlet port 17 to the outlet fitting 13. The illustrated dispenser is thus capable of dispensing substances within container 3 not only in the form of liquids, but also in the form of solids, powders, pastes, and the like.

Should the pressure in the water supply pipe attached to the inlet fitting 12 fail, check valve 30 will prevent a backflow to the water supply pipe and will vent the backflow to the atmosphere via vent 33.

FIGS. 5–7 illustrate a mounting member, generally designated 40, for mounting the dispenser 2, together with its container 3, to a supporting surface. Mounting member 40 is preferably made of an elastic plastic material, and is formed with an elastically-expandable socket 41 for removably receiving the container 3 with the dispenser 2 attached to it. Mounting member 40 further includes openings 42 (FIG. 6) for mounting it, together with the attached dispenser and container, to any suitable supporting surface.

Figure 8:
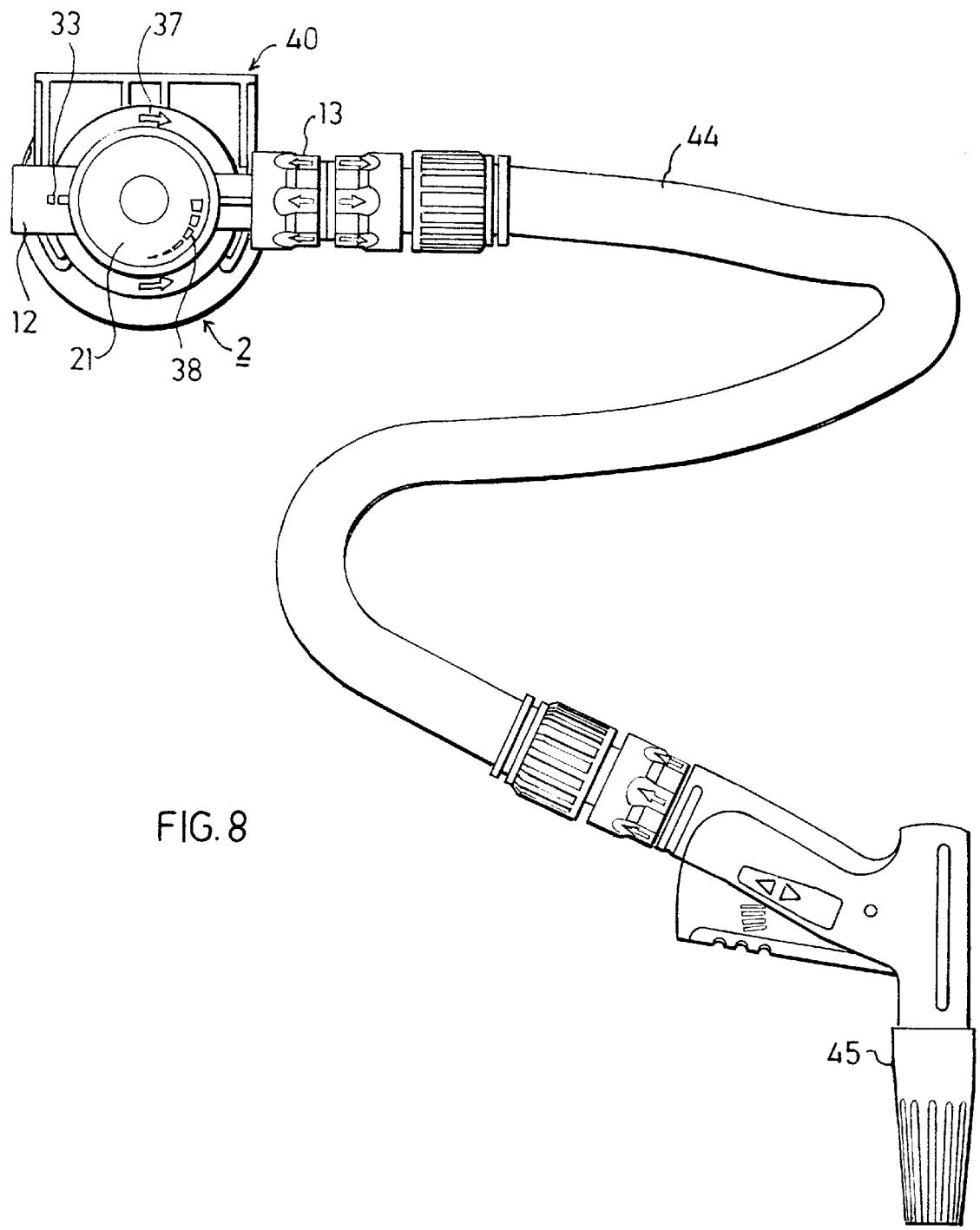
FIG. 8 is a top plan view illustrating the dispenser of FIGS. 1–7 used in a hand sprayer.
Figure 9:
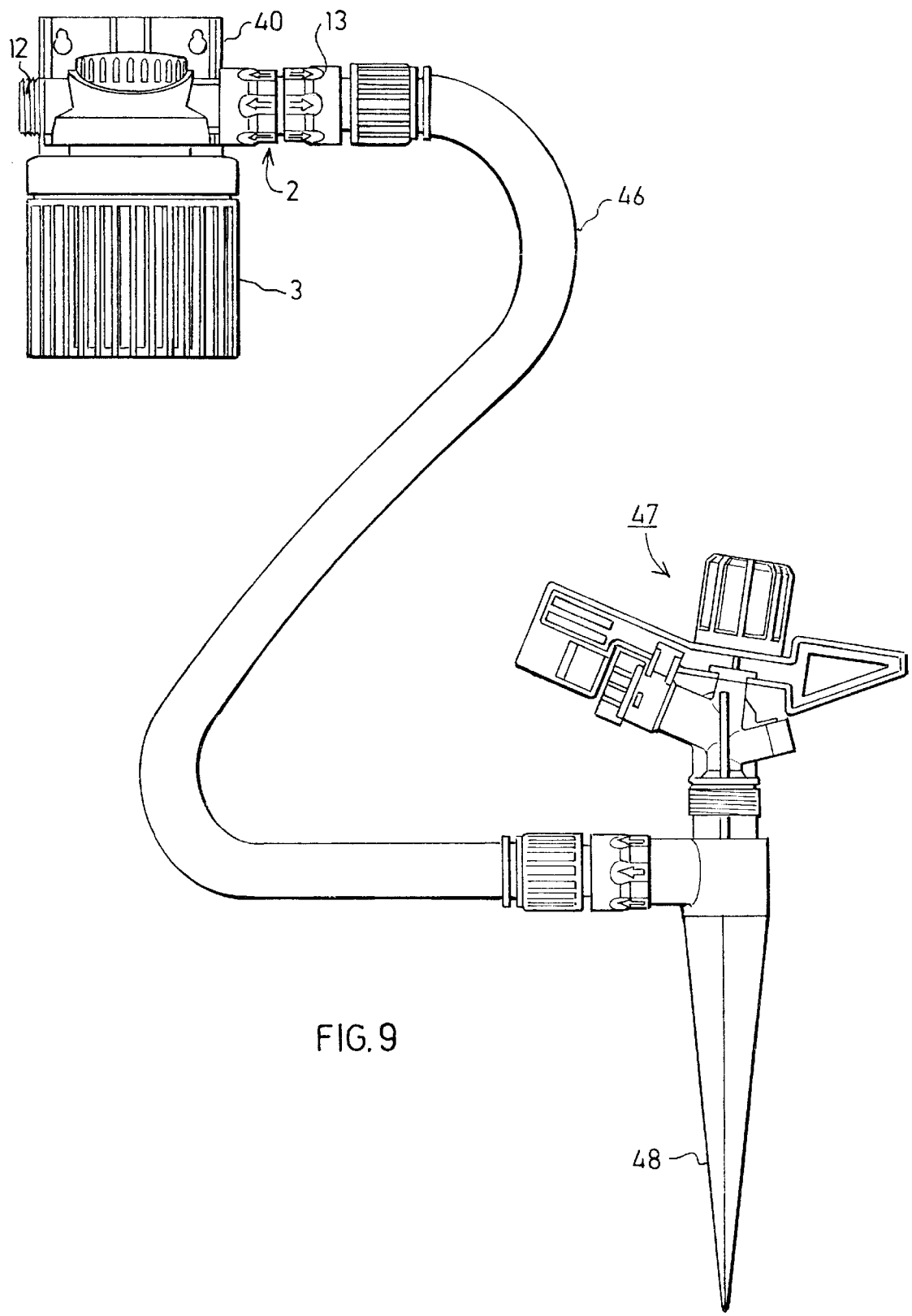
FIG. 9 is a side elevational view illustrating the dispenser of FIGS. 1–7 used in a water irrigation sprinkler.

FIG. 8 illustrates the dispenser 2, including its mounting member 40, connected by a pipe 44 to a handsprayer 45, e.g., for hand-spraying plants or crops with a herbicide or other similar material. FIG. 9 illustrates the dispenser 2, including its mounting member 40 and container 3, connected by a pipe 46 to a rotary sprinkler 47 mounted in the ground by a stake 48, for adding fertilizer or other additive to the irrigation water discharged by the sprinkler.

While the invention has been described with respect to one preferred embodiment, and several applications of that embodiment, it will be appreciated that these are set forth merely for purposes of example, and that many other variations, modifications and applications of the invention may be made.

What is claimed is:

1. A dispenser for dispensing a mixture of a substance diluted with a liquid, said dispenser including a housing comprising:
    an attaching section for attaching the housing to a container for said substance;
    a dispenser inlet for connection to a pipe supplying said liquid;
    a dispenser outlet for connection to a pipe to deliver said mixture;
    a chamber communicating with said dispenser inlet and outlet and including a chamber bottom wall formed with a container inlet port and with a container outlet port such that, when a container is attached to the housing, the container inlet port leads from said chamber to the container, and the container outlet port leads from the container via said chamber to the dispenser outlet;
    and a control valve in said chamber for controlling the flow of the liquid therethrough to said container inlet port;
    said container inlet port being eccentric with respect to, and extending obliquely through, said chamber bottom wall so as to be slanted in the tangential direction of the container such that when the container is attached to the housing, said container inlet port produces a swirl in the liquid inputted therethrough into the container to enhance the mixing thereof with the substance in the container.

2. The dispenser according to claim 1, wherein said container outlet port is also eccentric with respect to said chamber bottom wall, but at the opposite side from said inlet port, and also extends obliquely through said bottom wall so as to be slanted in the tangential direction of the container to enhance said swirl and the mixing of the liquid with the substance in the container.

3. The dispenser according to claim 1, wherein said control valve includes a flow divider for dividing the flow of the liquid in said chamber from the dispenser inlet into a first stream directed through a first path from the dispenser inlet to said container inlet port when the container is attached to the housing, and a second stream directed through a second path from the dispenser inlet directly to the dispenser outlet.

4. The dispenser according to claim 3, wherein said chamber is of cylindrical configuration, and said control valve is manually rotatable therein to adjust the relative proportions of the liquid in said first and second streams.

5. The dispenser according to claim 1, wherein said control valve also controls the flow of the liquid from said container outlet port to said dispenser outlet.

6. The dispenser according to claim 1, wherein said chamber is of cylindrical configuration, and said control valve comprises a manually rotatable valve member formed with a first opening alignable with said container inlet port for controlling the liquid flow therethrough from said chamber into the container when attached to said housing, and a second opening alignable with said container outlet port for controlling the liquid flow from the container via said chamber to the dispenser outlet.

7. The dispenser according to claim 6, wherein said manually rotatable valve member includes a disc located within said chamber and formed with said first and second openings, and a knob located externally of the chamber and fixed to said disc for manually rotating the disc.

8. The dispenser according to claim 7, wherein said control valve further includes a plurality of partitions fixed between said knob and disc and located within said chamber for dividing the flow of the liquid into said chamber from the dispenser inlet into a first stream directed through a first path from the dispenser inlet to said container inlet port, when the container is attached to the housing; and a second stream directed through a second path from the dispenser inlet directly to the dispenser outlet.

9. The dispenser according to claim 8, wherein said partitions are in the form of ribs radiating from the center axis of the chamber and extending axially thereof.

10. The dispenser according to claim 9, wherein said ribs divide the interior of said chamber into:
    a first compartment in said first path establishing communication between said dispenser inlet and said container inlet port;
    a second compartment in said first path establishing communication between said container outlet port and said dispenser outlet;
    and a third compartment in said second path establishing communication directly between said dispenser inlet and said dispenser outlet.

11. The dispenser according to claim 10, wherein said ribs of the partition member include first and second short ribs aligned with said first and second openings in the disc, a third rib extending to the inner face of said chamber to define said first and second compartments, and a fourth rib terminating short of the inner face of said chamber to define said third compartment.

12. The dispenser according to claim 11, wherein said four ribs are equally spaced angularly around the center axis of said chamber such that each of said first and second compartments occupies a sector of approximately 90° of the chamber, and said third compartment occupies a sector of approximately 180° of the chamber.

13. The dispenser according to claim 1, wherein said dispenser inlet includes a check valve permitting liquid forward flow from the dispenser inlet into said chamber and blocking liquid backflow from said chamber to the dispenser inlet.

14. The dispenser according to claim 13, wherein said dispenser inlet further includes a vent to the atmosphere between said check valve and said chamber, said check valve being effective to close said vent during forward flow from the dispenser inlet to the chamber, but to open said vent during backflow from the chamber to the dispenser inlet to thereby vent to the atmosphere any backflow from the chamber to the dispenser inlet.

15. A dispenser for dispensing a mixture of a substance diluted with a liquid, said dispenser including a housing comprising:

an attaching section for attaching the housing to a container for said substance;

a dispenser inlet for connection to a pipe supplying said liquid;

a dispenser outlet for connection to a pipe to deliver said mixture;

a cylindrical chamber communicating with said dispenser inlet and outlet and including a chamber bottom wall formed with a container inlet port and with a container outlet port such that, when a container is attached to the housing, the container inlet port leads from said chamber to the container, and the container outlet port leads from the container via said chamber to the dispenser outlet;

and a control valve in said chamber for controlling the flow of the liquid therethrough to said container inlet port;

said control valve comprising a manually rotatable valve member formed with a first opening alignable with said container inlet port for controlling the liquid flow therethrough from said chamber into the container when attached to said housing, and a second opening alignable with said container outlet port for controlling the liquid flow from the container via said chamber to the dispenser outlet;

said manually rotatable valve member including a disc located within said chamber and formed with said first and second openings, and a knob located externally of the chamber and fixed to said disc for manually rotating the disc;

said control valve further including a plurality of partitions fixed between said knob and disc and located within said chamber for dividing the flow of the liquid into said chamber from the dispenser inlet into a first stream directed through a first path from the dispenser inlet to said container inlet port, when the container is attached to the housing; and a second stream directed through a second path from the dispenser inlet directly to the dispenser outlet.

16. The dispenser according to claim 15, wherein said partitions are in the form of ribs radiating from the center axis of the chamber and dividing the interior of said chamber into:

a first compartment in said first path establishing communication between said dispenser inlet and said container inlet port;

a second compartment in said first path establishing communication between said container outlet port and said dispenser outlet;

and a third compartment in said second path establishing communication directly between said dispenser inlet and said dispenser outlet.

17. The dispenser according to claim 16, wherein said ribs of the partition member include first and second short ribs aligned with said first and second openings in the disc, a third rib extending to the inner face of said chamber to define said first and second compartments, and a fourth rib terminating short of the inner face of said chamber to define said third compartment.

18. The dispenser according to claim 17, wherein said four ribs are equally spaced angularly around the center axis of said chamber such that each of said first and second compartments occupies a sector of approximately 90° of the chamber, and said third compartment occupies a sector of approximately 180° of the chamber.

* * * * *